Figure 1:
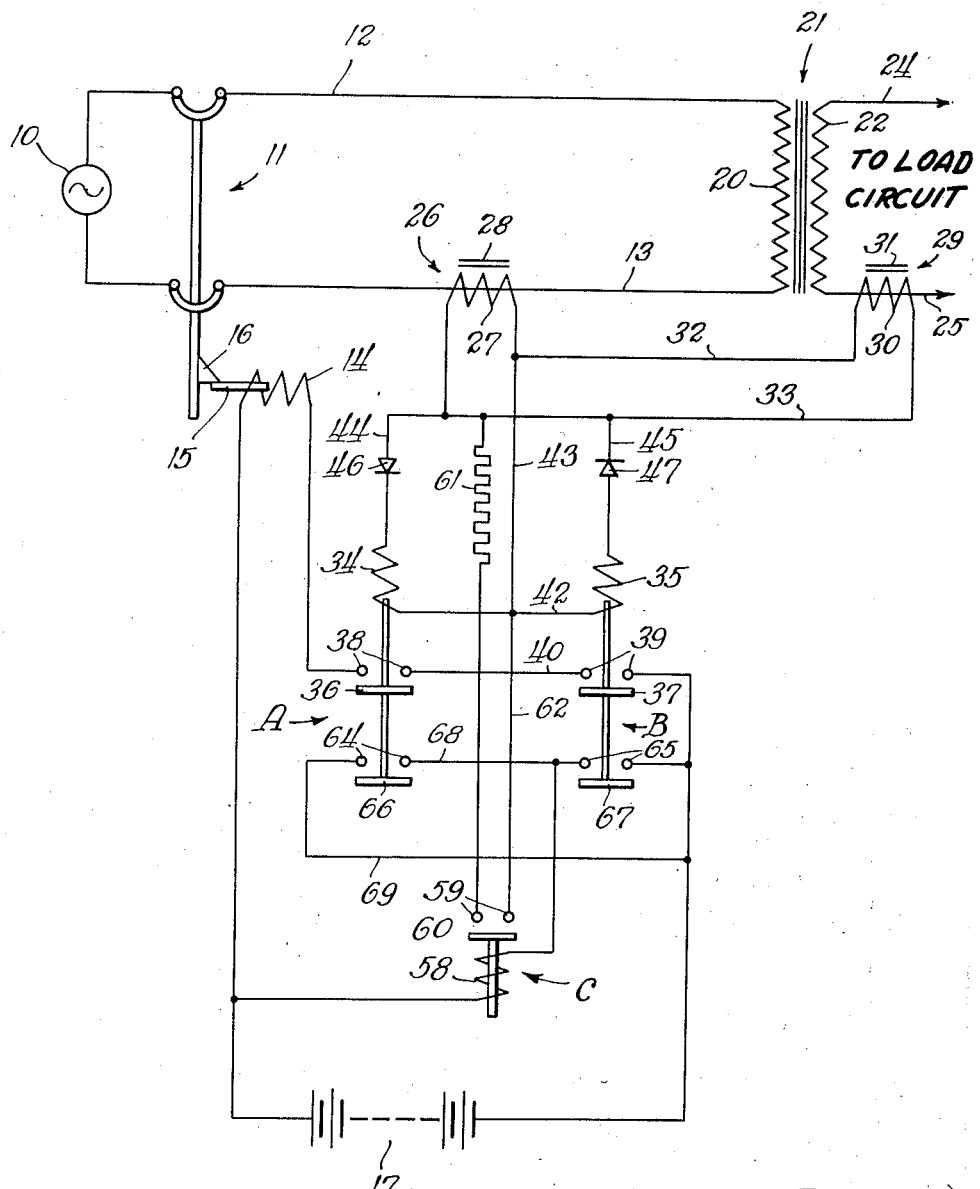

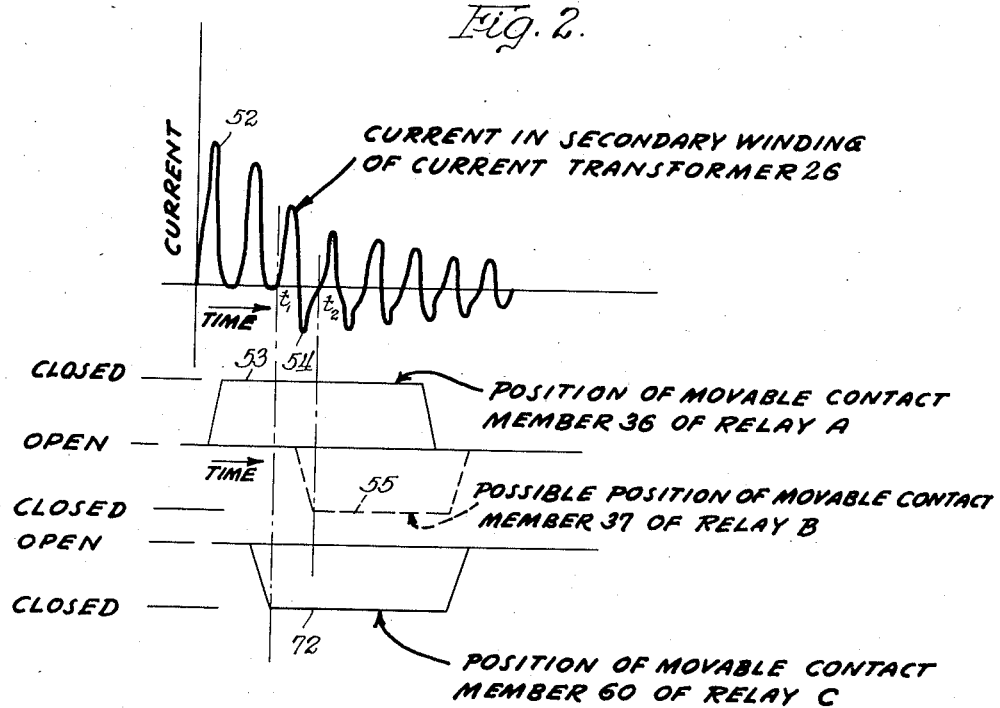
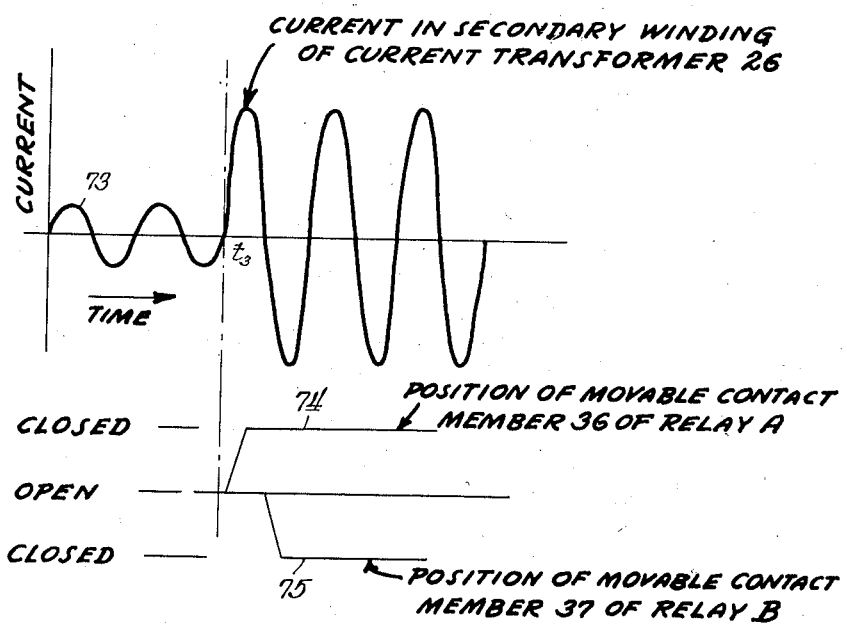

Patented Apr. 13, 1943

2,316,289

UNITED STATES PATENT OFFICE 2,316,289

CURRENT RESPONSIVE PROTECTIVE RELAY SYSTEM

Per N. Sandstrom, Chicago, Ill.

Application August 29, 1941, Serial No. 408,752

6 Claims. (Cl. 175—294)

My invention relates, generally, to systems for protecting alternating current circuits and it has particular relation to systems in which differential current responsive relays are provided which may be subjected to transient conditions which tend to cause false operation of the system. The present invention has particularly to do with improvements in the system shown in my Patent No. 2,246,816, issued June 24, 1941.

An object of my invention is to change the sensitivity of a current responsive protective relay system under certain conditions.

Another object of my invention is to provide for preventing the complete functioning of a current responsive protective relay system when it is subjected to transient conditions and a certain phase of the transient conditions simulate overload conditions in which case the system should function.

Still another object of my invention is to prevent false operation of a differential current protective relay system as a result of asymmetrical current flow which, before it ceases, approaches symmetrical characteristics.

Other objects of my invention will, in part, be obvious and in part appear hereinafter.

For a more complete understanding of the nature and scope of my invention, reference may be had to the following detailed description, taken in connection with the accompanying drawings, in which:

Figure 1 illustrates diagrammatically how my invention can be employed either as an over current responsive system or a differential current responsive system; and Figures 2 and 3 show curves which illustrate certain operating characteristics of my invention.

The current responsive protective relay system disclosed in my aforesaid patent will first be described and then the details of the present improvement will be described together with its application to the aforesaid system.

Referring now particularly to Figure 1 of the drawings, it will be observed that the reference character 10 designates a source of alternating current. This source may be a conventional 60-cycle source and, while only a single phase system has been illustrated, it will be understood that the present invention is equally applicable to a polyphase system, the single phase system having been shown in order to simplify the disclosure of the invention.

The alternating current source 10 is connected by means of a conventional circuit breaker, shown generally at 11, to conductors 12 and 13. The circuit breaker 11 is provided with a trip winding 14 which is arranged to attract a latch member 15 which, when positioned underneath a detent 16, serves to hold the circuit breaker 11 in closed position. The trip winding 14 is arranged to be energized from a suitable source, such as a battery 17, in a manner to be hereinafter set forth, for moving the latch member 15 out of the path of the detent 16 to permit the circuit breaker 11 to be operated to the open circuit position.

The conductors 12 and 13 are connected to energize a primary winding 20 of a transformer, shown generally at 21. The transformer 21 is provided with a secondary winding 22 which, as shown, is connected to a load circuit comprising conductors 24 and 25.

Associated with the conductor 13 is a current transformer, shown generally at 26. The conductor 13 provides the primary winding for the transformer 26. It has a secondary winding 27 disposed on a core 28 in accordance with conventional practice. The current transformer 26 can be employed, as will hereinafter appear, either in conjunction with an over current protective relay system or in conjunction with a differential current protective system.

For the differential current protective system a current transformer, shown generally at 29, is provided. It is associated with the conductor 25, which forms the primary winding therefor. A secondary winding 30 is provided on a core 31, again in accordance with conventional practice.

In accordance with conventional over current protection practice, the secondary winding 27 of the current transformer 26 would be connected to a conventional type of over current relay. That is, the secondary winding 27 would be connected to the operating winding of an overcurrent relay. On the occurrence of a predetermined over current flow in the conductors 12 and 13, the over current relay would be operated in such manner as to energize the trip winding 14 and effect the opening of a circuit breaker 11. In such case it is desirable that the over current relay operate to trip the circuit breaker only in the event that a fault condition exists. However, such an over current relay is not only responsive to fault current conditions, but also it is responsive to transient current conditions which, in some respects, may have the same effect as fault currents. However, because of the transient character of these currents as compared to fault currents, it is undesirable that the circuit breaker 11 be tripped out as a result of these transient currents, since they quickly disappear.

As a result of the occurrence of a fault on the system when this invention is applied as a differential protective system and the fault is outside of the zone of protection the core 28 of the current transformer 26 may become saturated to a greater or lesser extent, depending upon the magnitude of the direct current component of the fault current. As a result of this saturation, sufficient current may flow through the operating winding of a conventional over current relay to effect the tripping of the circuit breaker controlled thereby, even though no fault exists on the part of the system protected by this differential protective system.

According to prior practice, the conventional over current relay is so arranged that it will not operate as a result of the current flow through its operating winding due either to the occurrence of a transient condition or to current flow which is abnormal because of the saturation of the core of the current transformer. This differentiation is effected by so adjusting the over current relay that it is responsive only to currents in excess of the magnitudes of the currents likely to be encountered under these conditions. Obviously, then, the over current relay, when so adjusted, is relatively insensible to low fault currents and does not afford the degree of protection which is desired.

If the transformer 26 is employed in conjunction with the current transformer 29 in a differential current protective system, then, as shown, the secondary windings 27 and 30 are connected in parallel circuit relation by conductors 32 and 33 so that under normal operating conditions the same current flows through both of them. The winding of the conventional over current relay is connected across this parallel connection and, under normal operating conditions, no current flows through it. However, in the event that a fault occurs in the device, such as the transformer 21, between the transformers 26 and 29, then unequal or opposing currents flow through the secondary windings of the current transformers and consequently the winding of the over current relay is energized to effect the operation of a circuit breaker, such as the circuit breaker 11. Of course, it is desirable the the over current relay in the differential current protective system function only on the occurrence of an actual fault in the device protected. However, in accordance with prior art practice, the current responsive relay in the differential current protective system must be so adjusted that it is insensitive to the conditions previously described which do not involve the occurrence of a fault in the device protected. Consequently, the differential relay systems of the prior art are not as sensitive to the occurrence of a fault condition as desired, because it is necessary to obviate, in so far as possible, a false operation resulting from causes other than the occurrence of a fault.

I have observed that the undesirable over current conditions, aside from the normal fault current conditions, are accompanied, in the majority of instances, by positive or negative resultant components of current flow. The current responsive relays of the prior art are generally arranged to be responsive to the magnitude of the over current without regard to its polarity. For example, when the circuit breaker 11 is closed to energize the transformer 21, there may be an inrush of current to the primary winding 20 which is considerably greater in magnitude than the normal load current. This is due to the condition in which the core of the transformer 21 was left when the primary winding 20 was previously deenergized and the point on the voltage wave at which the circuit is completed. This initial inrush current is predominantly positive or negative, or is asymmetrical rather than symmetrical. Since it quickly disappears as the system settles down to steady state operating conditions, it is undesirable that any relaying action take place as a result of this.

With a view to differentiating between actual fault current conditions and conditions which may have the semblance of fault current conditions, I employ two relays A and B instead of a single relay, in accordance with the conventional prior art practice. The relays A and B are provided, respectively, with operating windings 34 and 35, movable contact members 36 and 37, and stationary contact members 38 and 39. It will be understood that, when the operating windings 34 and 35 are properly energized, the movable contact members 36 and 37 are moved to bridge the corresponding stationary contact members 38 and 39. These stationary contact members are connected in series circuit relation by a conductor 40. It will be apparent that both sets of stationary contact members 38 and 39 must be bridged in order to complete the series circuit connection therethrough and, since they are connected in series circuit relation with the trip winding 14 and the battery 17, both of the relays A and B must be operated in order to energize this trip winding and trip the circuit breaker 11 to the open circuit position.

It will be observed that the operating windings 34 and 35 are commonly connected together by a conductor 42 and are connected by a conductor 43 to one terminal of the secondary winding 27 of the current transformer 26. The operating windings 34 and 35 are connected by conductors 44 and 45 to the other terminal of the secondary winding 27.

Since over current conditions which are not actual fault current conditions are accompanied by predominantly positive or negative current flows, I take advantage of this phenomena and provide a relay system which requires for its operation to energize the trip winding 14 of the circuit breaker 11 a predetermined magnitude of both positive and negative half cycles of current but which system will not cause operation for only one of these polarities. In the system shown in Figure 1 this is accomplished by polarizing the relays A and B by means of rectifiers 46 and 47 which are connected in the circuits of the operating windings 34 and 35. The rectifiers 46 and 47 are oppositely connected so that, for example, only positive half-cycles of alternating current flow through the operating winding 34 and negative half-cycles of alternating current flow through the operating winding 35. The rectifiers 46 and 47 may be of the conventional dry type, such as the copper oxide film type, or they may be any other suitable type of rectifier.

The operation of the system shown in Figure 1 and described hereinbefore can best be understood by reference to the curves shown in Figure 2 of the drawings. It will be noted that the curve 52 illustrates the current that may flow in the secondary winding 27 of the current transformer 26 when the circuit breaker 11 is closed to energize the primary winding 20 of the transformer 21. In this particular case the initial cycles of this current flow are predominantly positive. On flow of this current in the secondary winding 27 the rectifier 46 permits it to flow through the winding 34 of relay A and consequently its movable contact member 36 is operated as indicated by the curve 53 to the closed position where stationary contact members 38 are bridged. During this period the rectifier 47 prevents energization of the winding 35 so that the circuit for energizing the trip winding 14 remains open at contact members 39 of relay B.

The asymmetrical current flow presented by the curve 52 tends to assume symmetrical characteristics and, as shown, negative loops, as indicated at 54, appear below the zero axis. The rectifier 47 permits flow of these negative current loops through the winding 35 of the relay B and, in some instances, this current flow may be sufficient to operate this relay and cause its movable contact member 37 to bridge the stationary contact members 39. This may occur as indicated at the time $t_2$ and the movement of the contact member 37 in this case is indicated by the curve 55 shown by a broken line.

It is with a view to preventing the operation of the second relay, such as the relay B, under the foregoing conditions that the present invention is particularly addressed. For this purpose an auxiliary relay C is provided. The relay C has an operating winding 58, stationary contact members 59 and a movable contact member 60 which is arranged to bridge the stationary contact members 59 when the winding 58 is energized.

When the winding 58 is energized and contact members 59 are bridged, an impedance device, such as a resistor 61, is connected in shunt circuit relation with the windings 34 and 35 of the relays A and B, respectively. It will be observed that one terminal of the resistor 61 is connected to the conductor 33 and its other terminal is connected to one of the stationary contact members 59. A conductor 62 connects the other stationary contact member 59 to the conductor 42. When the resistor 61 is connected in this shunt circuit relation, additional current is required to energize the relay B, for example, sufficiently to cause its contact members 39 to be bridged and close the trip circuit. The same is equally true with reference to the relay A when the relay B is first energized under transient conditions in which the asymmetrical current flow is initially predominantly negative.

The auxiliary relay C is energized on energization of either relay A or B. For this purpose relay A is provided with stationary contact members 64 and relay B is provided with stationary contact members 65. A movable contact member 66 of relay A is movable with the contact member 36 for bridging the contact members 64. Similarly a movable contact member 67 is movable with the contact member 37 of relay B for bridging the contact members 65. The contact members 64 and 65 are connected in parallel circuit relation by conductors 68 and 69.

Referring again to Figure 2 of the drawings it will be observed that at the time $t_1$ contact members 59 have been bridged by movable contact member 60, the movement of which is represented by the curve 72. It will be noted that the resistor 61 is connected in shunt circuit relation with the winding 35 of relay B under these assumed conditions prior to the time $t_2$ that sufficient negative loops of the transient current flow to effect operation of relay B. Because of this, the sensitivity of relay B is proportionately reduced and, within predetermined limits, it will not operate even though the current flow thereto, except for the resistor 61 connected in parallel therewith, would be sufficient to effect its operation.

In Figure 3 of the drawings the curve 73 represents the current flow through the secondary winding 27 of the current transformer 26. At the time $t_3$ it is assumed that a fault occurs in the transformer 21 so that the current flow through the secondary winding 27 materially increases is illustrated. This current flow includes both positive and negative half cycles. Because of it relay A operates and its movable contact member 36 closes as indicated by the curve 74. On the succeeding negative loop of the fault current relay B operates and its movable contact member 37 closes as indicated by the curve 75. The closure of both contact members 36 and 37 completes the energizing circuit for the trip winding 14 and the circuit breaker 11 is tripped out to clear the fault.

When the conditions exist as shown in Figure 3 of the drawings relay B will operate shortly after relay A operates and at the same time or slightly before relay C functions to insert the shunting resistor 61. This is due to the fact that the fault current flow is more symmetrical than asymmetrical as illustrated by the curve 52 in Figure 2 of the drawings. There is not as great time lag between the flow of half cycles of one polarity and the flow of half cycles of the opposite polarity when fault conditions exist as shown in Figure 3 of the drawings as there is when the asymmetrical current flows as shown in Figure 2 of the drawings.

As the transient current decreases in magnitude, the relay system will be restored to its normal deenergized sensitive condition and will then be capable of functioning in the intended manner on the occurrence of a fault.

Since certain changes can be made in the foregoing system and different embodiments of the invention can be made without departing from the scope thereof, it is intended that all matter described hereinbefore and shown in the accompanying drawings shall be interpreted as illustrative and not in a limiting sense.

I claim as my invention:

1. In a protective system for an alternating current circuit, in combination, relay means including a plurality of winding means and contact means controlled thereby, circuit means connecting said winding means for energization to the alternating current circuit, means interposed in said circuit means and arranged in such manner as to require a flow therethrough of successive positive and negative half cycles of alternating current for operating said contact means, and means for reducing the sensitivity of one of said winding means a predetermined time after the first half cycle of alternating current has energized the other winding means.

2. In a protective system for an alternating current circuit, in combination, polarized relay means including a pair of windings and contact means controlled thereby, circuit means connecting said windings for energization to the alternating current circuit in such manner that successive positive and negative half cycls of alternating current are required to flow through said windings for effectively operating said contact means, and means for reducing the sensitivity of said polarized relay means after one of said windings has been energized sufficiently to operate its contact means.

3. In a protective system for an alternating current circuit in which transient conditions are likely to occur accompanied by asymmetrical current flow, in combination, a pair of relays each including a winding and normally open contact means controlled thereby, the contact means of said relays being connected in series circuit relation, circuit means connecting said relay windings for energization to the alternating current circuit, a rectifier individual to each relay winding connected in said circuit means so that positive half cycles of alternating current flow through one relay winding and negative half cycles of alternating current flow through the other relay winding, and means for reducing the sensitivity of either of said relay windings after the other relay winding has been energized sufficiently to operate its contact means.

4. In a protective system for an alternating current circuit in which transient conditions are likely to occur accompanied by asymmetrical current flow, in combination, a pair of relays each including a winding and normally open contact means controlled thereby, the contact means of said relays being connected in series circuit relation, circuit means connecting said relay windings for energization to the alternating current circuit, a rectifier individual to each relay winding connected in said circuit means so that positive half cycles of alternating current flow through one relay winding and negative half cycles of alternating current flow through the other relay winding, and means for shunting either of said relay windings to reduce its sensitivity after the other relay winding has been energized sufficiently to operate its contact means.

5. In a protective system for an alternating current circuit in which transient conditions are likely to occur accompanied by asymmetrical current flow, in combination, a pair of relays each including a winding and normally open contact means controlled thereby, the contact means of said relays being connected in series circuit relation, circuit means connecting said relay windings for energization to the alternating current circuit, a rectifier individual to each relay winding connected in said circuit means so that positive half cycles of alternating current flow through one relay winding and negative half cycles of alternating current flow through the other relay winding, an auxiliary relay having a winding adapted to be energized on operation of either of said relays and normally open contact means, and a resistor adapted to be connected in shunt circuit relation with the windings of said pair of relays on closure of said contact means of said auxiliary relay for reducing the sensitivity of said pair of relays.

6. In a protective system for an alternating current circuit in which transient conditions are likely to occur accompanied by asymmetrical current flow, in combination, a pair of relays each including a winding and two sets of normally open contact means controlled thereby, one set of contact means of each relay being connected in series circuit relation and the other set of contact means of each relay being connected in parallel circuit relation, circuit means connecting said relay windings for energization to the alternating current circuit, a rectifier individual to each relay winding connected in said circuit means so that positive half cycles of alternating current flow through one relay winding and negative half cycles of alternating current flow through the other relay winding, an auxiliary relay having a winding adapted to be energized on closure of either of said sets of parallel connected contact means and normally open contact means, and a resistor adapted to be connected in shunt circuit relation with the windings of said pair of relays on closure of said contact means of said auxiliary relay for reducing the sensitivity of said pair of relays.

PER N. SANDSTROM.